(12) United States Patent
Zhang et al.

(10) Patent No.: US 10,903,738 B2
(45) Date of Patent: Jan. 26, 2021

(54) HIGH CONVERSION-RATIO HYBRID SWITCHED POWER CONVERTER

(71) Applicant: Analog Devices International Unlimited Company, Limerick (IE)

(72) Inventors: Jindong Zhang, Fremont, CA (US); Jian Li, Milpitas, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/372,012

(22) Filed: Apr. 1, 2019

(65) Prior Publication Data
US 2019/0348913 A1 Nov. 14, 2019

Related U.S. Application Data

(60) Provisional application No. 62/671,391, filed on May 14, 2018.

(51) Int. Cl.
*H02M 3/07* (2006.01)
*H02M 1/08* (2006.01)

(52) U.S. Cl.
CPC .............. *H02M 3/07* (2013.01); *H02M 1/08* (2013.01)

(58) Field of Classification Search
None
See application file for complete search history.

(56) References Cited

U.S. PATENT DOCUMENTS

| | | | |
|---|---|---|---|
| 10,027,223 B1 * | 7/2018 | Zhang | H02M 3/07 |
| 10,224,803 B1 * | 3/2019 | Rainer | H02M 1/083 |
| 10,547,241 B1 * | 1/2020 | Li | H02M 3/158 |
| 2015/0077075 A1 * | 3/2015 | Knoedgen | H02M 3/1584 323/272 |
| 2019/0273436 A1 * | 9/2019 | Tang | H02M 3/158 |

* cited by examiner

*Primary Examiner* — Jeffrey A Gblende
(74) *Attorney, Agent, or Firm* — Schwegman Lundberg & Woessner, P.A.

(57) ABSTRACT

A voltage converter circuit comprises a charge pump circuit, a pulse width modulation (PWM) filter stage circuit, and a control circuit. The charge pump circuit includes multiple switching transistors arranged as a switching bridge including a first bridge portion connected to a second bridge portion; a midpoint capacitor connected to a circuit node coupling the first bridge portion and the second bridge portion; and a first flying capacitor coupled to the first bridge portion and the second bridge portion. The PWM filter stage circuit is coupled to the charge pump circuit and a first input/output terminal and includes a first inductor coupled to the first flying capacitor and the second bridge portion of the switching bridge. The control circuit is configured to control activation of switching transistors of the switching bridge to generate a regulated voltage at the first input/output terminal.

11 Claims, 12 Drawing Sheets

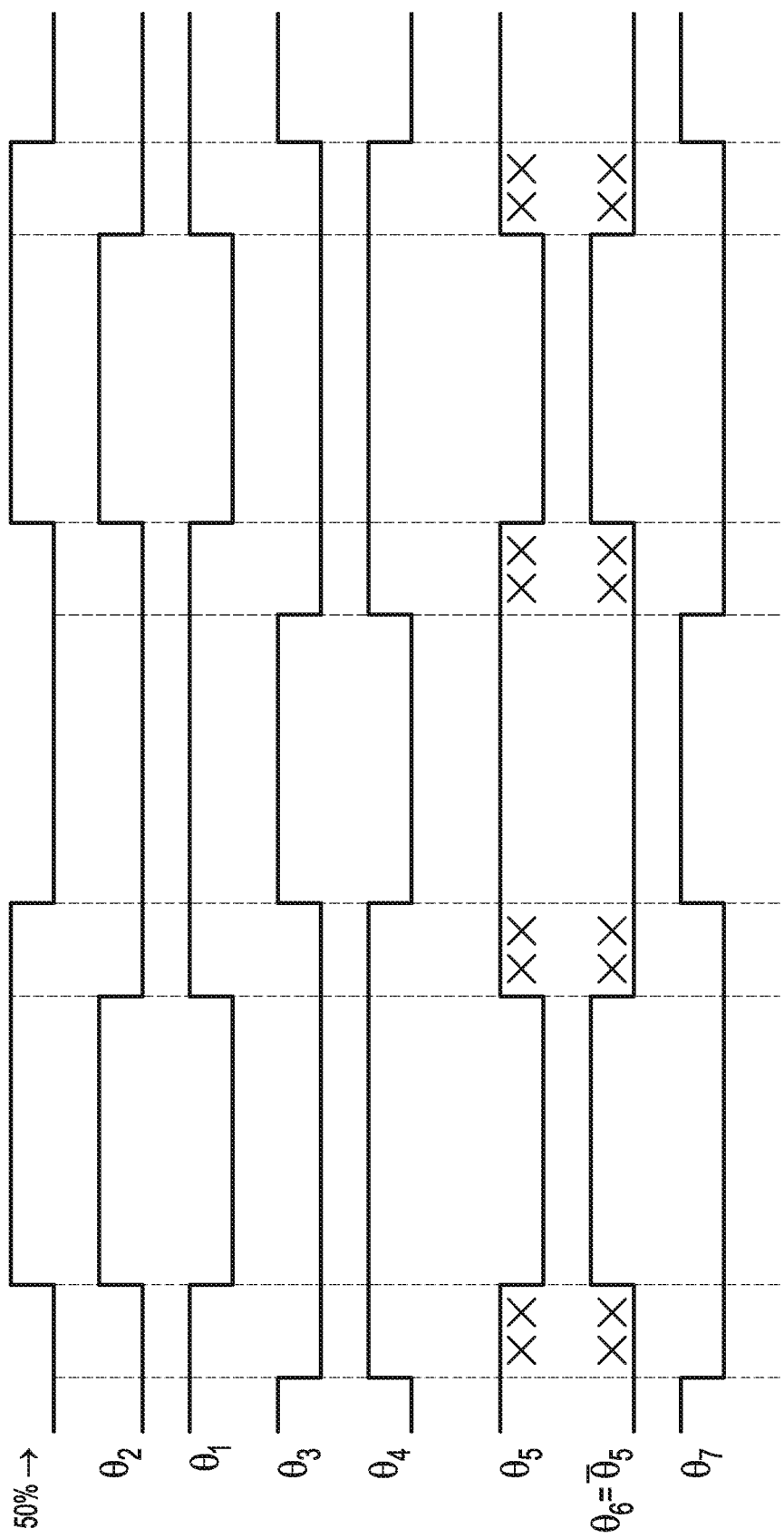

US 10,903,738 B2

HIGH CONVERSION-RATIO HYBRID SWITCHED POWER CONVERTER

CLAIM OF PRIORITY

This application claims the benefit of priority to U.S. Provisional Application No. 62/671,391, filed on May 14, 2018, the entire contents of which is incorporated herein by reference.

BACKGROUND

The disclosure relates generally to switched power converters.

Switched power converter circuits provide efficient power solutions for power supply design. A switched power converter contains one or more switching elements (e.g., one or more transistors) and reactive elements (e.g., capacitors and inductors) that, in connection with a periodic switching of the switching elements, generates a regulated voltage or current. A direct current to direct current converter (DC-DC) converts one DC voltage to another DC voltage. A conventional pulse-width-modulation (PWM) converter controls the duty-cycle of power switches and adjusts the power inductor current to regulate output voltage. A switched capacitor converter usually does not have a bulky power inductor, and therefore can be low profile and have high power density. However, a switched capacitor converter usually does not regulate the output voltage. A hybrid converter integrates the PWM converter with a switched capacitor converter in one single stage, therefore, reducing the size of its inductor and total solution, while providing tight output voltage regulation. There are applications that need high conversion-ratio hybrid converters.

SUMMARY

A hybrid switched capacitor power converter according to various implementations includes a plurality of switching transistors, a plurality of capacitors and one or more power inductors, with power inductors being connected between a first node linking two of the connected plurality of switching transistors to receive a switched power from the switching transistors and a second node which is the converter output (or input) terminal. A control circuit is configured to switch the plurality of first switching transistors according to a switching duty cycle to provide the regulated output voltage.

Other aspects disclosed herein include corresponding methods, systems, apparatuses, and electronic device products for implementation of the switched capacitor power converter. It is understood that other configurations will become readily apparent to those skilled in the art from the following detailed description, wherein various exemplary configurations and implementations are shown and described by way of illustration.

BRIEF DESCRIPTION OF THE DRAWINGS

The accompanying drawings are presented to aid in the description of example aspects and are provided solely for illustration of embodiments and not limitation thereof.

FIG. 3B illustrates exemplary switching signals for switching the transistors of the exemplary hybrid switched power converter of FIG. 3A.

DETAILED DESCRIPTION

Aspects and features, and exemplary implementations practices, and applications are disclosed in the following description and related drawings. Alternatives to disclosed examples may be devised without departing from the scope of disclosed concepts.

The term "converter," as used herein, encompasses but is not limited to any one of, or any combination of "regulator," "DC regulator," "voltage regulator," "DC voltage regulator," "DC-DC converter," "DC converter" and "converter," and includes, but is not limited to, the plain meaning of any one or more of these terms.

Figure 1:
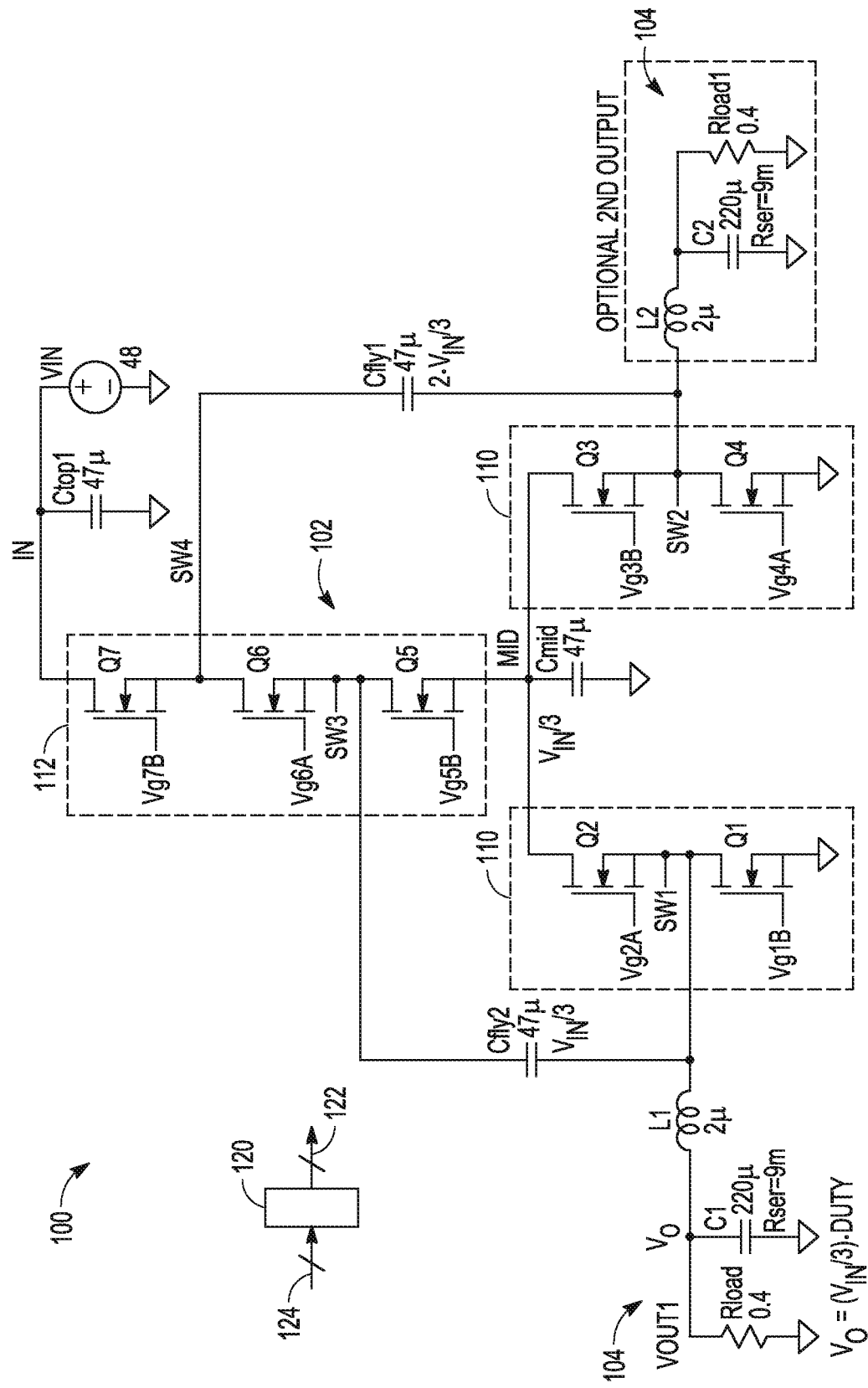
FIG. 1 is a diagram of an exemplary hybrid switched capacitor power converter.

FIG. 1 is a diagram of a first exemplary hybrid switched power converter 100 according to aspects of the subject technology. In the depicted example, power converter 100 includes a switching bridge 102, which includes a first set of switching transistors (e.g., Q2, Q4, and Q6) and a second set of transistors (e.g., Q1, Q3, Q5, and Q7) that are switched on an off complimentary to each other according to a switching cycle (e.g., at a predetermined switching frequency and duty cycle) to drive a resonant circuit, or pulse-width modulation (PWM) filter stage circuit 104. For example, the transistors may be switched at a 50% duty cycle, wherein each transistor is switched on or off in phase opposition for exactly the same time period. The example of FIG. 1 may be based on a Dickson-type converter and an integrated buck converter.

Switching bridge 102 includes a lower portion 110 and an upper portion 112. The lower portion 110 includes a full switching bridge with switching transistors Q1 and Q2 connected in series between a first terminal and a second terminal, and with switching transistors Q3 and Q4 also in series between the first and second terminals. In the depicted example, the second terminal is an earth ground. Both strings are in parallel to each other between the first and second terminals. In this regard, the source terminal of transistor Q1 is connected to the second terminal, and the drain terminal of transistor Q1 is connected to the source terminal of Q2 at the first node SW1. The drain terminal of transistor Q2 is connected to the capacitor Cmid at a second node MID. The source terminal of transistor Q4 is connected to the second terminal, and the drain terminal of transistor Q4 is connected to the source terminal of Q3 at a third node SW2. The drain terminal of transistor Q3 is connected to the capacitor Cmid at the second node MID. A capacitor Cmid is connected in parallel with each string of series connected transistors (e.g., Q1, Q2 and Q3, Q4), between the terminal MID and the second terminal.

The upper portion 112 of switching bridge 102 is connected in series with and between a power input terminal Vin and the upper portion 110 at capacitor Cmid. The upper portion 112 includes three transistors (e.g., Q5, Q6, Q7) connected in series. In this regard, the source of the transistor Q5 is connected to the capacitor Cmid at the second node MID, and the drain of the transistor Q5 is connected to the source of transistor Q6 at a fourth node SW3. The drain of transistor Q6 is connected to the source of transistor Q7 at a fifth node SW4. The drain of transistor Q7 is connected to the power input terminal Vin.

A flying capacitor Cfly1 is connected between the third node SW2 and the fifth node SW4. A second flying capacitor Cfly2 is connected between the first node SW1 and the fourth node SW3. In the depicted example, in input of the output circuit 104 (e.g., L1) is connected at the first node SW1. Optionally, a second output circuit, or second PWM filter stage circuit 104 may be connected at the third node SW2.

The subject technology may include a control circuit 120. The control circuit 120 may be a PWM controller that generates PWM signals 122 to switching bridge 102 to switch switching transistors Q1 through Q7 of the bridge on and off according to a set switching frequency and/or duty cycle. In this regard, control circuit 120 may include an input/output (I/O) interface 124, and may be programmed (e.g., before start-up of the converter) with a predetermined switching frequency, for example, by way of the I/O interface. During normal operational mode, transistors Q2, Q4, and Q6 are periodically switched together (as "Group 1"), and complementary to the switching of transistors Q1, Q3, Q5, and Q7, which are also switched together (as "Group 2"). The switching duty cycle may be generated through a feedback compensation circuit to regulate the output voltage Vo.

The switching bridge 102 together with capacitors Cfly1, Cfly2 and Cmid forms a 3:1 Dickson-type switched capacitor converter, while capacitor Cmid is the output capacitor of this Dickson converter. When Group 1 is activated (on) and Group 2 is deactivated (off) according to the switching cycle, capacitor Cmid is placed in series with second flying capacitor Cfly2, and capacitors Cmid and Cfly2 are placed in parallel with the first flying capacitor Cfly1, between the node SW4 and the second terminal (e.g., ground). When Group 2 is activated (on) and Group 1 is deactivated (off) according to the switching cycle, capacitor Cmid and second flying capacitor Cfly2 are placed in parallel with each other, and the parallel of capacitors is placed in series with first flying capacitor Cfly1. The charge pump portion of the converter converts a voltage between the input (or output) terminal and the midpoint capacitor by a three-to-one conversion ratio, or Vmid=(Vin/3). In the steady state, in this depicted configuration, midpoint capacitor Cmid has the voltage Vmid=Vin/3, regardless of the switching PWM duty-cycle of Q1 through Q7.

Different from the Dickson converter, the additional output circuit 104 is added to switching node SW1 to form an integrated hybrid converter. The output circuit 104 includes an output inductor L1 and one or more output capacitors C1 that are energized by each pulse from transistor pair of Q2 and Q1. With L1 and C1, there is an integrated buck converter and transistors Q1 and Q2 serve as the buck converter power switches. In this case, capacitor Cmid voltage Vmid is the input voltage of the integrated buck converter. The buck output voltage Vo=Vmid*Duty, where Duty is the on-time of transistor Q2 over a full switching period. Therefore, Vo=(Vin/3)*Duty. Thus, the output voltage of this high conversion ratio converter is regulated by the PWM duty cycle. For example, the output voltage of the power converter may be increased or decreased when the duty cycle is increased or decreased. When the groups of switching transistors are switched according to a 50% duty cycle, the output voltage Vo is about Vin/6.

In the above implementation, power converter 100 may operate as a step down or hybrid buck converter. Similarly, if the Vin and Vo terminals are swapped, converter 100 may operate as a step up or hybrid boost converter while Vo=(Vin*3)/(1−Duty).

The transistors Q1 to Q7 are depicted as n-channel FETS. However, it is understood that the transistors may alternatively be p-channel FETS, bi-polar transistors, or a combination thereof. The foregoing source-to-drain connections of the respective transistors may be reversed to be, for example, drain-to-source. The number of components may also be reduced by using dual FET design. For example, power converter 100 may use three dual FETS (low voltage) and one single FET (high voltage). The dual-FETs may be used for Q1 and Q2, Q3 and Q4, and Q5 and Q6, respectively. Transistor Q7 may be implemented as a single FET in this example. An integrated power module with all components in one package may also be implemented in the design.

Figure 2A:
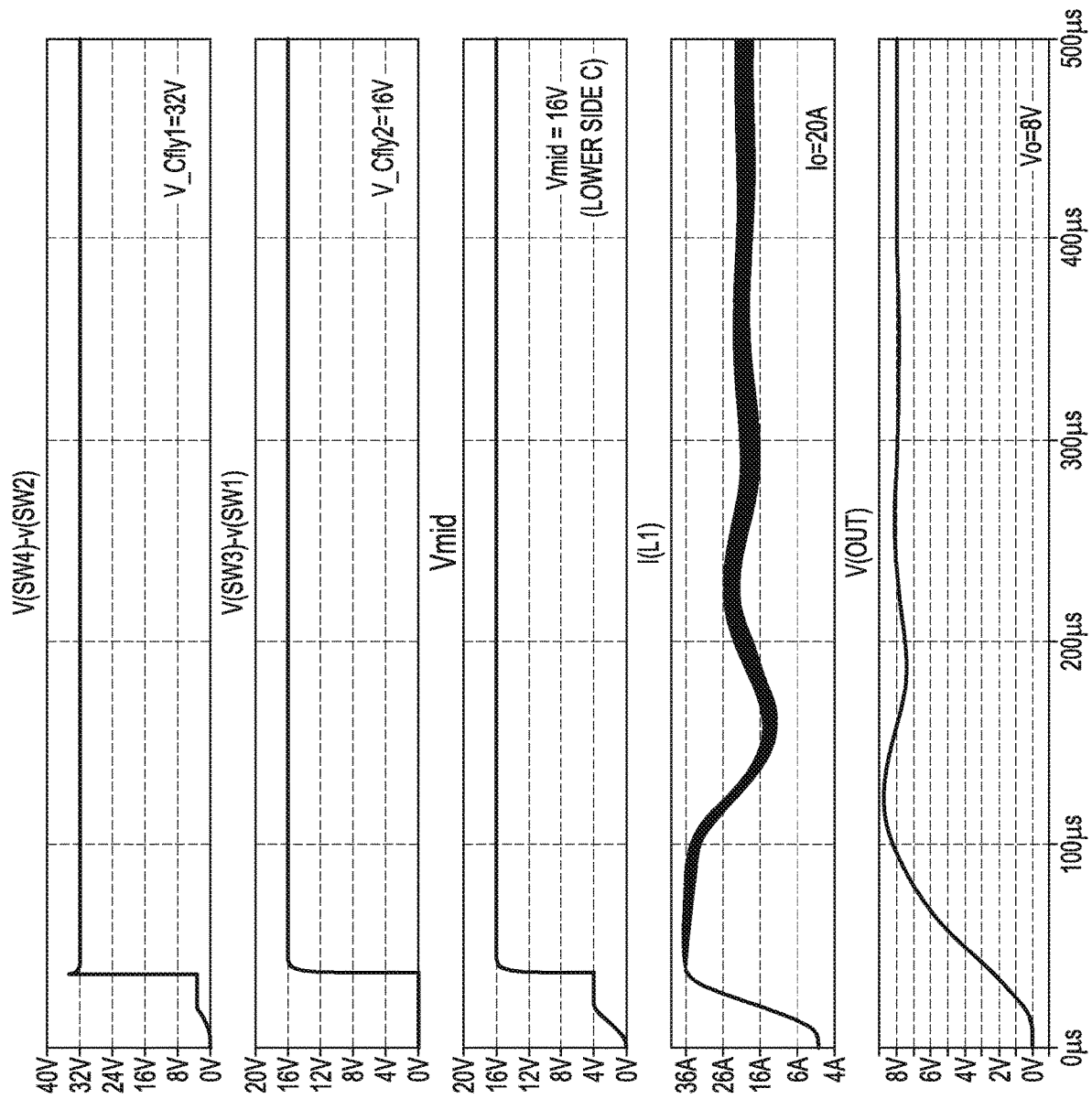
FIGS. 2A and 2B illustrate exemplary results obtained in simulations applying the control signals to a model of the exemplary switched capacitor power converter of FIG. 1.
Figure 2B:
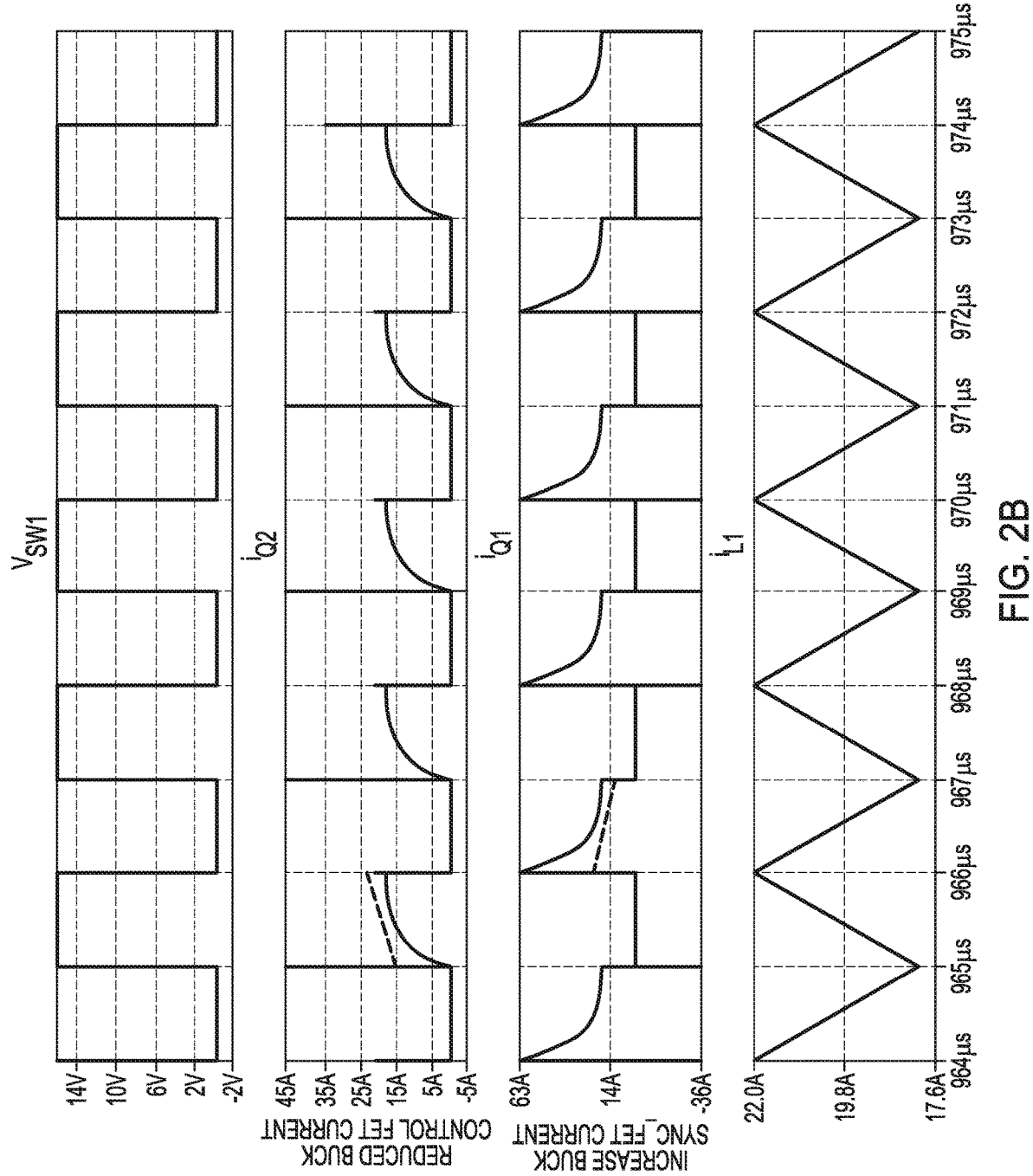

FIGS. 2A and 2B illustrate exemplary results obtained in simulations applying the control signals to a model of the exemplary switched power converter of FIG. 1. In this example, the input voltage is 48V. The PWM duty cycle is about 50%. Therefore, the output voltage Vo is about 8V.

Figure 3A:
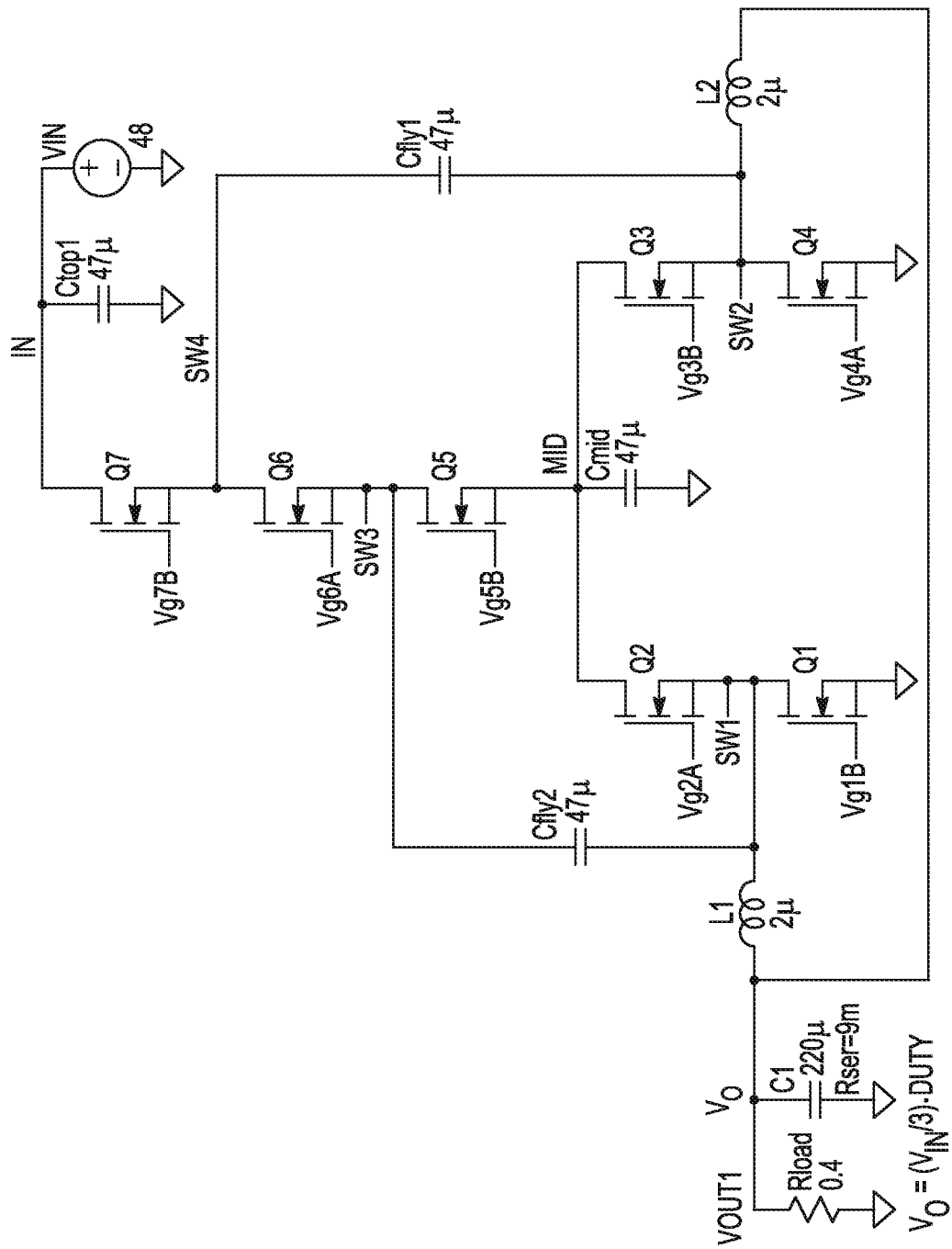
FIG. 3A is a diagram of another exemplary hybrid converter with an additional inductor to form a two-phase, single output voltage hybrid converter.

FIG. 3A illustrates another exemplary hybrid converter. It is the FIG. 1 hybrid converter with an additional inductor L2 connected between the switching node SW2 and the output terminal Vo, to form a two-phase, single output voltage hybrid converter. Because switching nodes SW1 and SW2 are driven using 180-degree out-of-phase waveform, inductor L1 and L2 current ripple also is 180-degree out-of-phase. As a result, the total output current ripple is reduced by the out-of-phase ripple cancellation. Consequently, the output voltage ripple is also reduced.

FIG. 3B illustrates exemplary switching control signals for switching the transistors of the exemplary hybrid switched power converter of FIG. 3A. The "X" regions in the signals indicate "don't care" regions where the control signal may be either high or low. The PWM duty cycle is defined as the on-time of the control signal for Q2 over the full switching period. The control signal for Q1 is complementary to the Q2 control signal. The on-time of the control signal for Q3 is substantially equal to Q1 but with 180-degree phase delay. The control signal for Q4 is complementary to the Q3 control signal.

Control circuit 120 may operate the bridge configuration of switching transistors Q1 through Q7. In this regard, activation signals Vg1 through Vg7 are transmitted at a first voltage by control circuit 120 to the gates of switching transistors Q1 through Q7 to switch on Q1 through Q7, respectively, and transmitted at a second voltage (e.g., zero volts) to switch off the transistors. When control circuit 120 is actively transmitting control signals Vgx, the switching bridge 102 (and/or its switching transistors) is considered to be in the active state. When no signals are transmitted to a component (or transmitted at the second voltage) the corresponding component(s) is considered to be in the deactivated state.

Figure 4A:
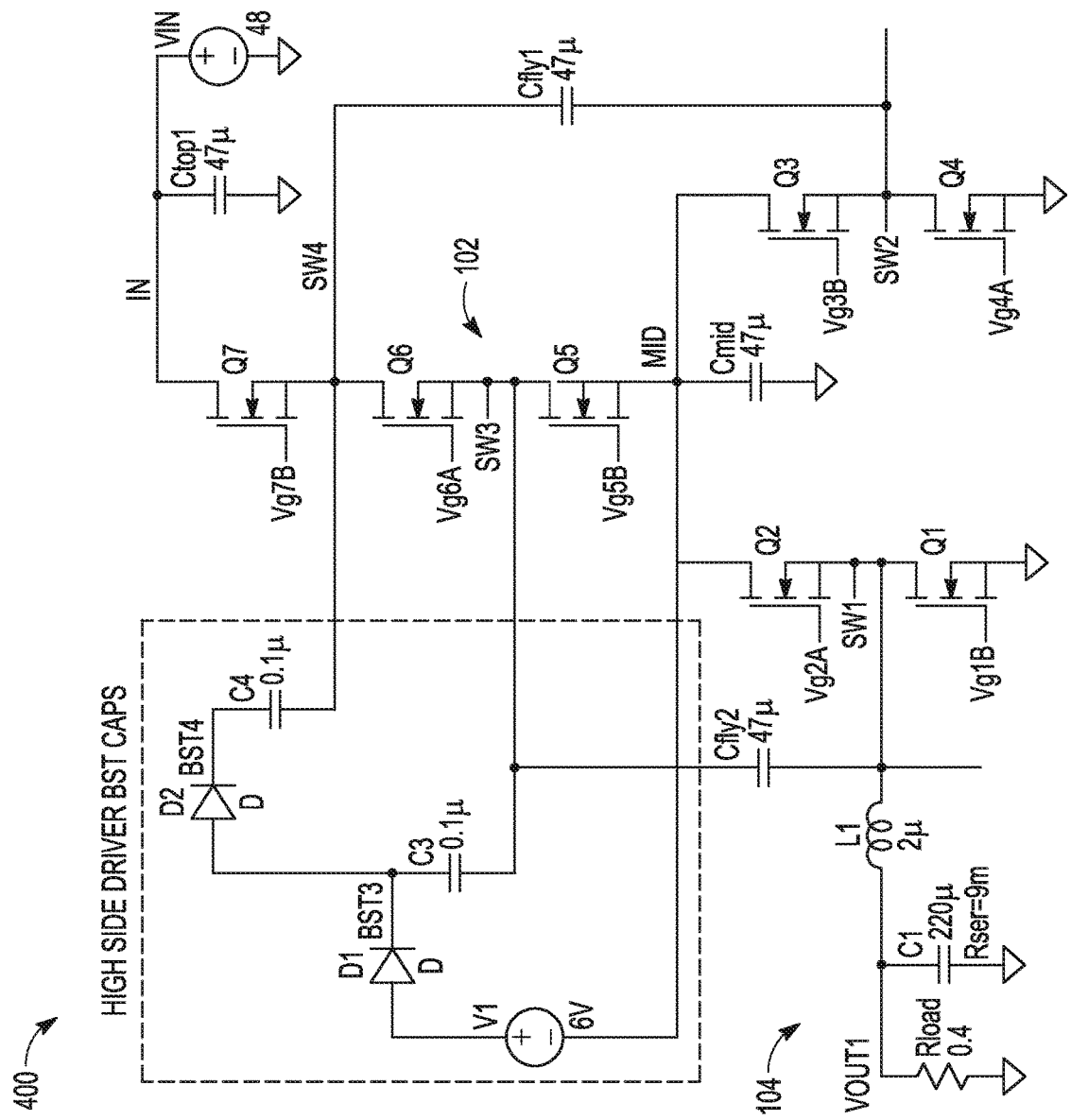
FIG. 4A is a diagram of another exemplary hybrid switched capacitor power converter with an additional circuit to implement the switch driver bias supply for high side power switches.

FIG. 4A is a diagram of another exemplary hybrid switched power converter with an additional exemplary circuit 400 to implement the driver bias supplies for high side power transistors Q5, Q6 and Q7. In the depicted example, driver bias circuit 400 includes cascade boost capacitors C3 and C4, and diodes D1 and D2, for high side drivers. Input power V1 may be provided as a bias supply. In this configuration, capacitor Cmid may function as a reference ground for V1. When Q5 is on, C3 is charged by V1 through diode D1. C3 provides the FET driver bias voltage for Q6. When Q6 is on, C4 is charged by C3 through diode D2. C4 provides the FET driver bias voltage for Q7.

Figure 4B:
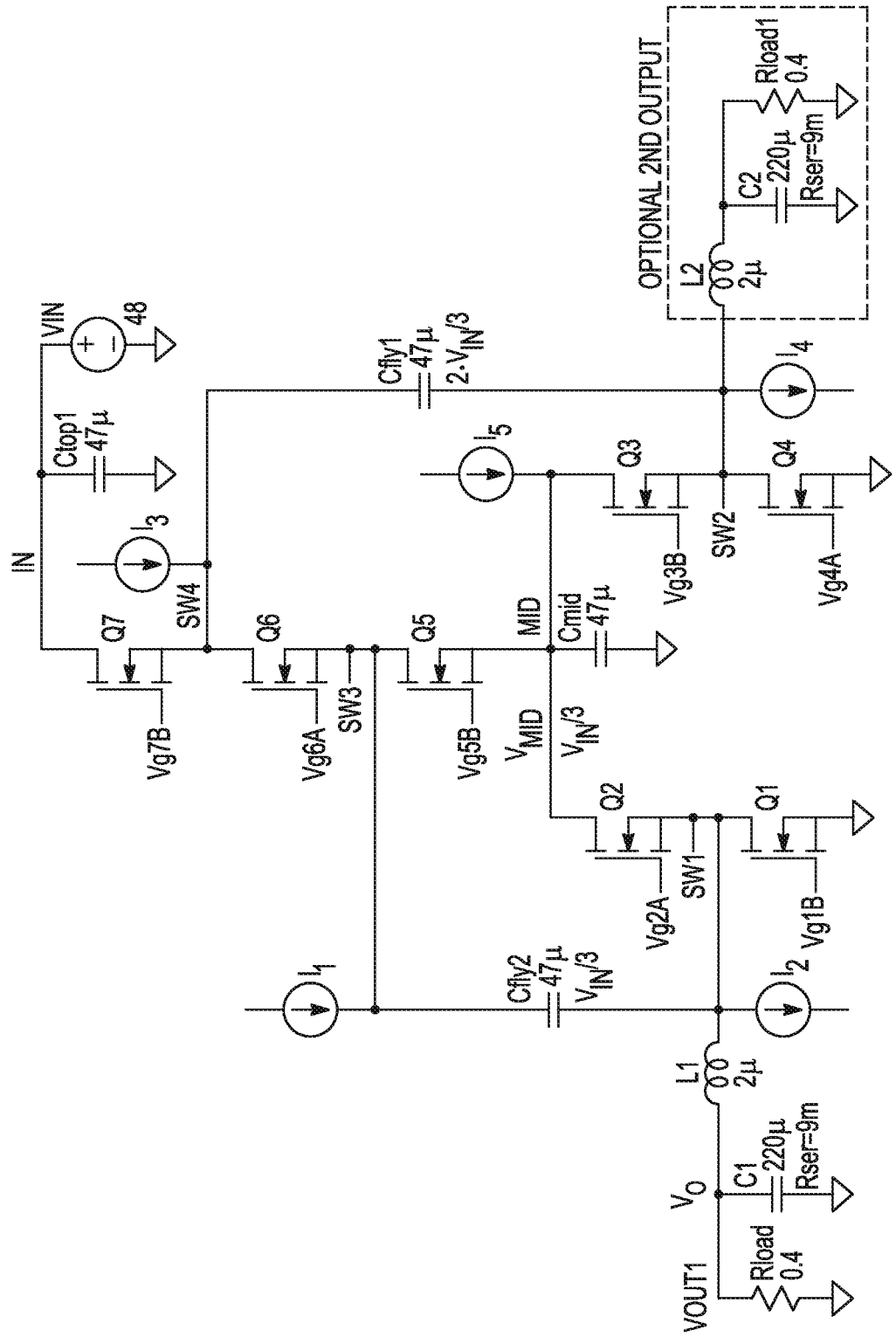
FIG. 4B is a diagram of another exemplary hybrid switched capacitor power converter with additional circuitry to implement pre-charging of all capacitors for soft-start power up.

FIG. 4B is a diagram of another exemplary hybrid switched power converter with additional exemplary circuitry to implement the pre-charging of capacitors during converter power up. In this exemplary implementation, multiple current sources I1-I5 can be used to pre-charge capacitors Cfly2, Cfly 1 and Cmid, before the switching of transistors Q1-Q7.

Figure 4C:
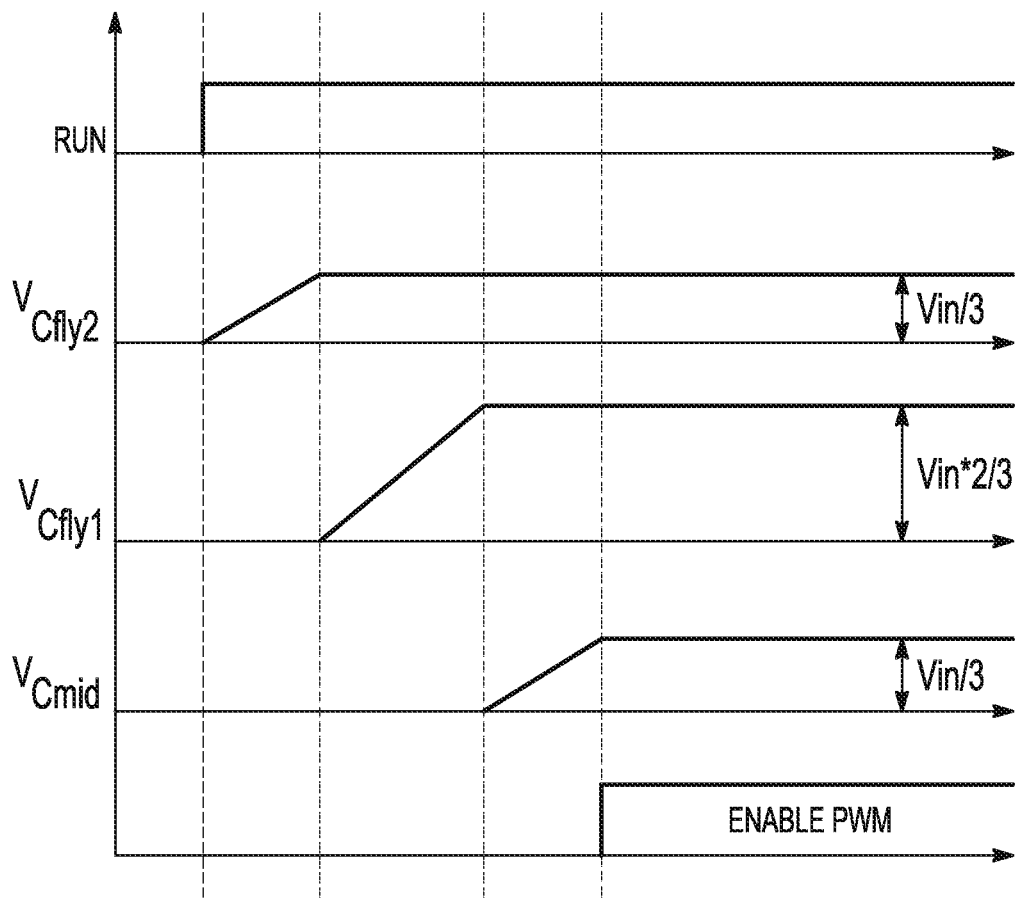
FIG. 4C illustrates exemplary waveforms for pre-charging capacitors of the circuit of FIG. 4B
Figure 4D:
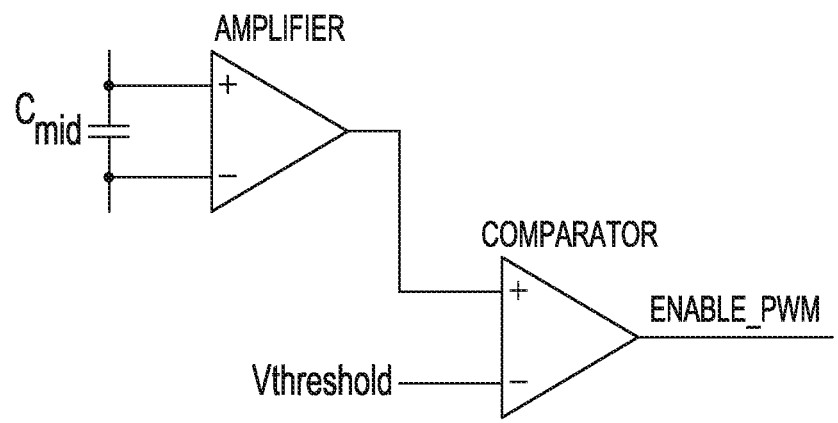
FIG. 4D illustrates an exemplary circuit to enable the main converter PWM signals.

FIG. 4C illustrates exemplary waveforms to pre-charge capacitors before the main converter PWM is enabled. When the RUN signal is high, the capacitor Cfly2 is first charged up by current sources I1 and I2 to about Vin/3 level. Then the capacitor Cfly1 is charged by current sources I3 and I4 to about Vin*2/3. After that, the capacitor Cmid is charged by the current source I5 to about Vin/3. Then the main converter PWM signals are enabled. FIG. 4D illustrate an exemplary circuit for sensing the Cmid voltage and comparing it with the target threshold voltage, in this example Vin/3, to enable the main converter PWM signals.

Figure 5:
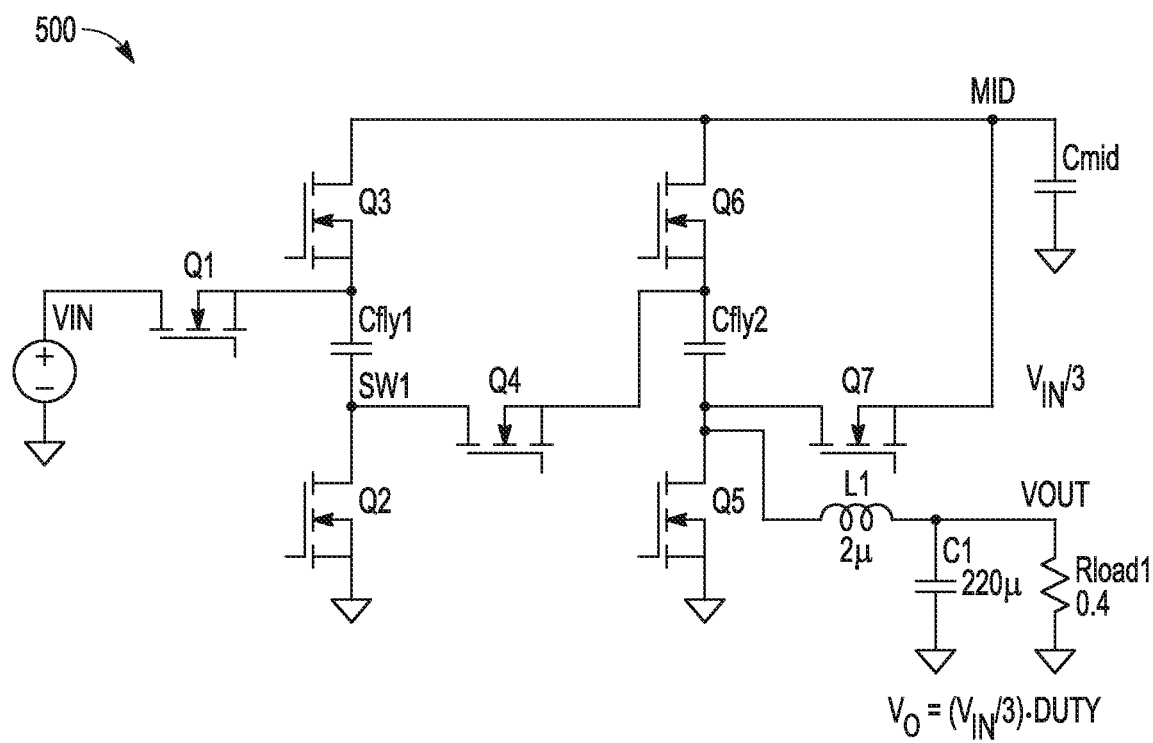
FIG. 5 is a diagram of another exemplary hybrid switched capacitor power converter that is a combination of a conventional 3:1 Series-Parallel type switched capacitor converter and a buck PWM converter.

FIG. 5 is a diagram of another exemplary hybrid switched capacitor power converter according to aspects of the subject technology. Power converter 500 implements, outside of a different topology, the same or similar features as the hybrid switched power converter 100 of FIG. 1. Power converter 500 implements a series-parallel switched converter with the integrated buck converter topology. In this configuration transistors Q1, Q4, and Q7 are switched together as Group 1, and transistors Q2, Q3, Q5, and Q7 are switched together as Group 2. Group 1 and Group 2 are switched on and off complimentary to each other according to a switching cycle (e.g., at a predetermined switching frequency and duty cycle) to drive an output inductor L1. In the depicted configuration, Vo=(Vin/3)*Duty. When the transistors are operating at substantially a 50% duty cycle, Vo=Vin/6.

Figure 6A:
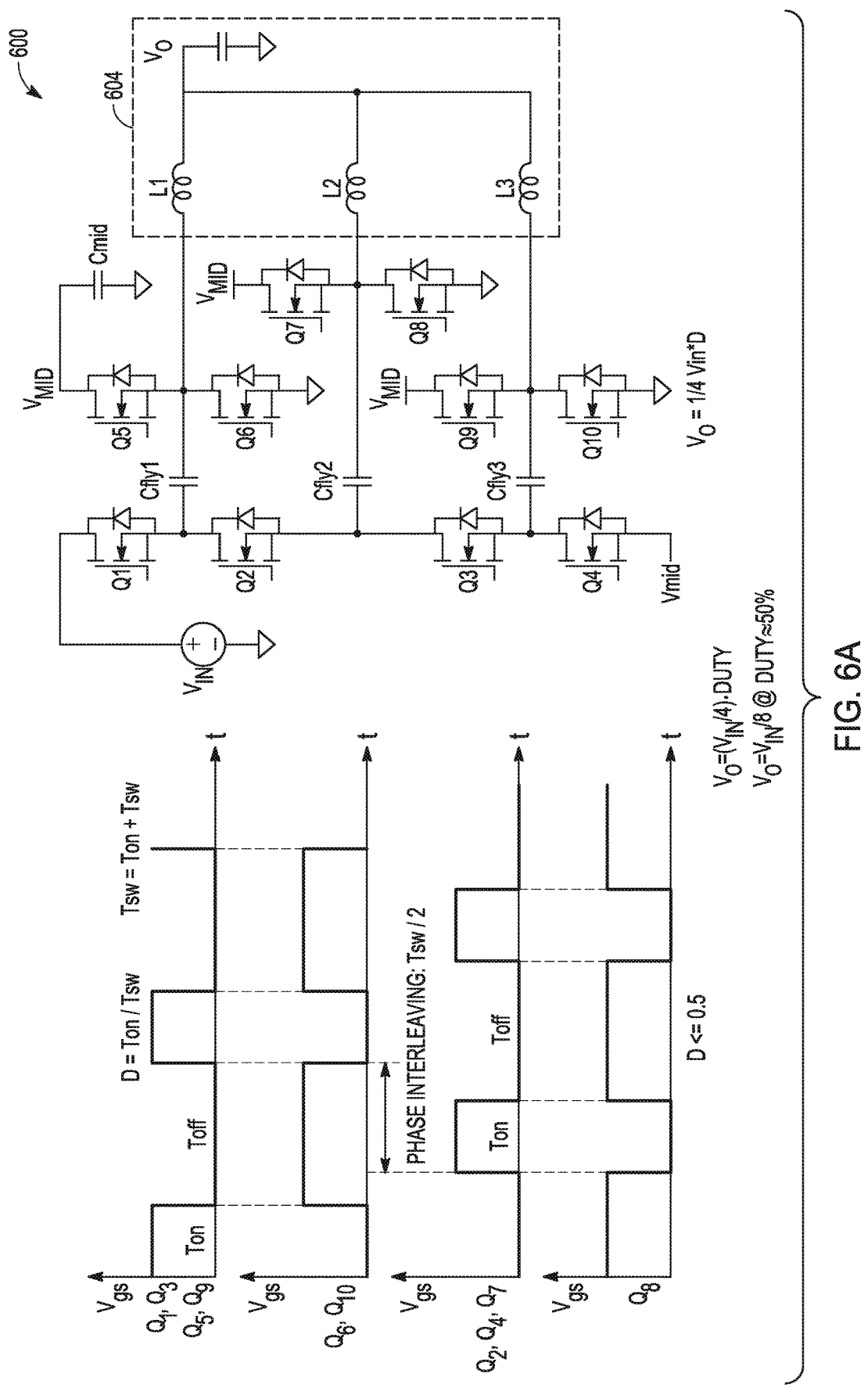
FIG. 6A is a diagram of another exemplary hybrid switched capacitor power converter and corresponding switching signals for controlling the converter.

FIG. 6A is a diagram of another exemplary hybrid switched capacitor power converter 600 and corresponding switching signals for controlling the converter according to aspects of the subject technology. Power converter 600 implements, outside of a different topology, the same or similar features as the hybrid switched power converter 100 of FIG. 1. In the depicted configuration, transistors Q1, Q3, Q5, and Q9 are switched together as Group 1, and transistors Q6 and Q10 are switched together as Group 2. The transistors of Group 1 and Group 2 are switched on an off complimentary to each other according to a first switching cycle (e.g., at a predetermined switching frequency and duty cycle). In the depicted configuration, transistors Q2, Q4, and Q7 are switched together as Group 3, and transistor Q8 is switched as Group 4. Group 3 and Group 4 are switched on an off complimentary to each other according to a second switching cycle (e.g., at a predetermined switching frequency and duty cycle). The phase of the switching of Groups 1 and 2 may be interleaved from the phase of the switching of Groups 3 and 4, as depicted in FIG. 6. Inductor L3 can be optional. In some implementations, the duty cycle and/or the on and off durations of Groups 1 and 3 may be substantially equal, and the duty cycle and/or the on and off durations of Groups 2 and 4 may be substantially equal. Hybrid switched capacitor power converter 600 includes a PWM filter stage circuit 604, with a respective inductor connected to each respective flying capacitor (Cfly 1, Cfly2, and Cfly3) at one side of the respective inductor connected to the respective capacitor and the other side of the inductor connected at output terminal Vo. An output capacitor is connected between Vo and ground. In the depicted configuration, Vo=(Vin/4)*duty. Vo=Vin/8 when the transistors are operating at substantially a 50% duty cycle.

Figure 6B:
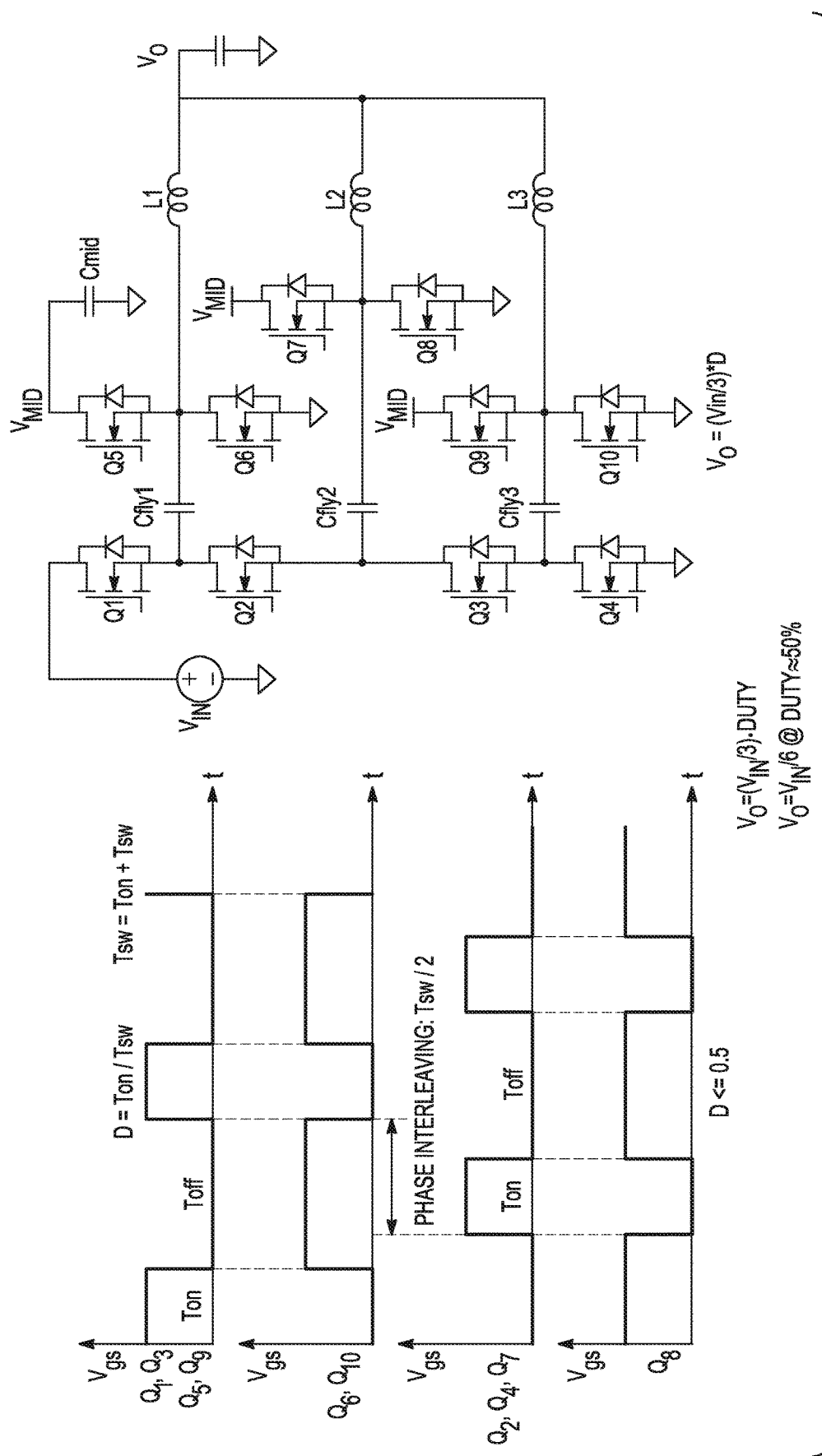
FIG. 6B is a diagram of still another exemplary hybrid switched capacitor power converter and corresponding switching signals for controlling the converter.

FIG. 6B is a diagram of another exemplary hybrid switched capacitor power converter. It is identical to FIG. 6A except the source of transistor Q4 is connected to ground. This converter allows output side to be isolated from input side except capacitors Cfly 1, Cfly2 and Cfly3. As a result, if there is a Vin side FET failure (short circuit), the output rail will not see high Vin voltage. Inductor L3 can be optional. In the depicted configuration, Vo=(Vin/3)*Duty. When the transistors are operating at substantially a 50% duty cycle, Vo=Vin/6.

Figure 7:
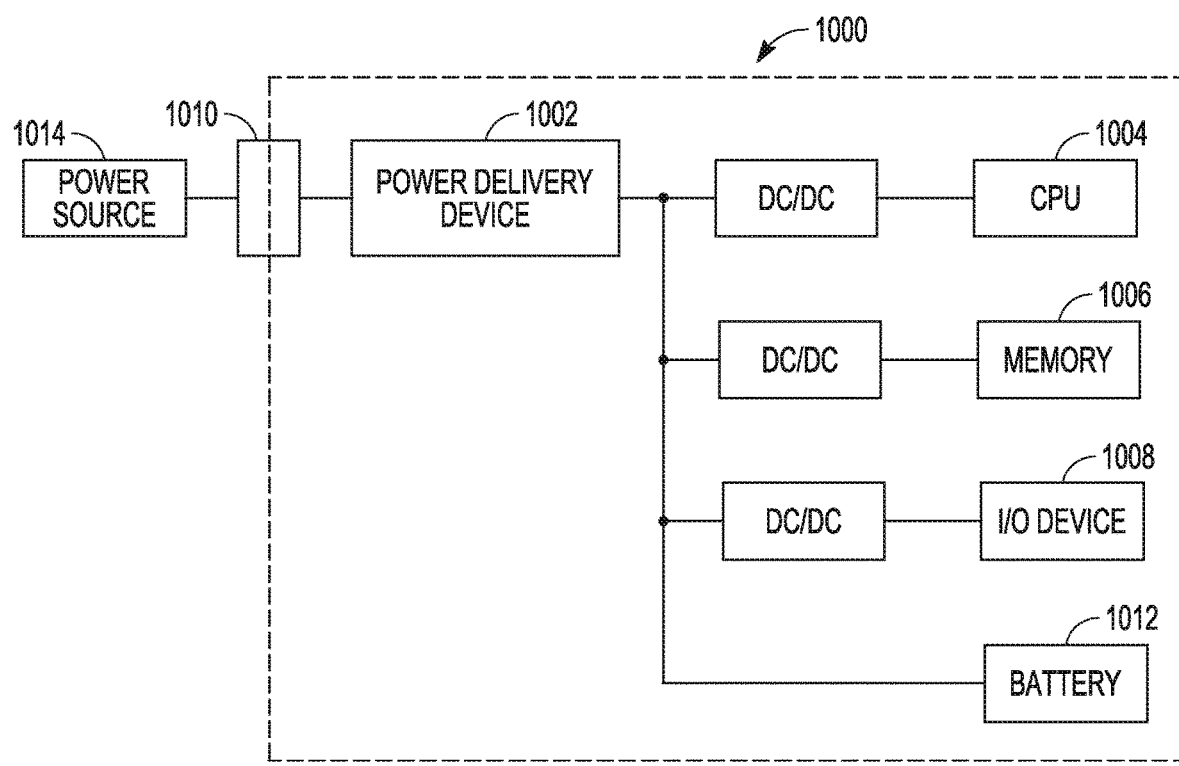
FIG. 7 is a diagram of an exemplary electronic system 1000 that implements a hybrid switched capacitor power converter.

FIG. 7 is a diagram of an exemplary electronic system 1000 that implements a hybrid switched power converter, according to various implementations described herein. Electronic system 1000, in combination with the disclosure regarding FIGS. 1-6, may be any electronic device utilizing power from a power source. For example, electronic system 1000 may be representative of a computing device (e.g., a personal or server computer or a mobile device such as a smartphone, tablet computer, laptop, PDA, a wearable such as a watch or band, or combination thereof), a networking device, an automotive electronics device, a consumer appliance, television or other display device, radio or telephone, home audio system, or the like.

In some implementations, electronic system may include a power delivery device 1002 (e.g., a power supply), downstream DC/DC converters, and loads. The power supply 1000 generates a local bus voltage as the input to multiple down-stream DC/DC converters. The load may include various components of system 1000, including one or more of a central processing unit (CPU) 1004, various memory systems 1006, one or more input and/or output (I/O) devices 1008, a power interface 1010, and one or more direct loads such as batteries 1012. The CPU 1000 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

A memory system 1006 may include, for example, volatile memory used to temporarily store data and information used to manage electronic system 1000, a random access memory (RAM), and/or non-volatile memory such as a magnetic disk, flash memory, peripheral SSD, and the like. I/O device 10008 may include an input device such as a keyboard, a touch screen, a touch pad, voice control system, or other device for input of data. I/O device 1008 may include an output device such as a display device, audio device (e.g., a speaker), or data interface (e.g., a host data bus) for output of data. In some implementations, one or more elements of electronic system 1000 can be integrated into a single chip. In some implementations, the elements can be implemented on two or more discrete components.

Power delivery device 1002 may include any of the previously described PWM power converter circuits (including an auxiliary bypass circuit), including a corresponding control circuit. Accordingly, power delivery device 1002 may be configured (e.g., as a step up or step down converter) to convert a first voltage to a second voltage, different than the first voltage. Power delivery device 1002 may receive an input power (e.g., at a voltage Vin) from an external power source 1014 via power interface 1010. The input power may be a DC power. In some implementations, the input power may be an alternating current source that is converted to DC (e.g., by power interface 1010) before being utilized by power delivery device 1002. Additionally, or in the alternative, the input power may be DC from battery 1012.

Power delivery device 1002 may produce a voltage according to the load requirements of various components of electronic device 1000. In this regard, power delivery device 1002 may implement multiple different types of converter circuits to accommodate different load requirements of the various components of electronic device 1000. Additionally, or in the alternative, power delivery device 1002 may be configured to provide charge to battery 1012 (e.g., as part of a battery charger system) based on power from external power source 1014.

ADDITIONAL DESCRIPTION AND ASPECTS

Aspect 1 can include subject matter, such as a voltage converter, comprising a charge pump circuit, a first PWM filter stage circuit, and a control circuit. The charge pump circuit includes multiple switching transistors arranged as a switching bridge including a first bridge portion connected to a first input/output terminal and a second bridge portion, a midpoint capacitor connected to a circuit node coupling the first bridge portion and the second bridge portion, and a first flying capacitor coupled to the first bridge portion and the second bridge portion. The first PWM filter stage circuit is coupled to the charge pump circuit and a second input/output terminal and includes a first inductor coupled to the first flying capacitor and the second bridge portion of the switching bridge. The control circuit is configured to control activation of switching transistors of the switching bridge to generate a regulated voltage at the first input/output terminal, including converting a voltage between the input terminal and the midpoint capacitor by a conversion ratio equal to or greater than three-to-one.

In Aspect 2, the subject matter of Aspect 1 optionally includes a first bridge portion including multiple switching transistors connected in series, and a second bridge portion including a first leg of multiple switching transistors connected in series and a second leg of multiple switching transistors connected in series, and the first leg of switching transistors is connected in parallel with the second leg of switching transistors.

In Aspect 3, the subject matter of Aspect 2 optionally includes a second flying capacitor, wherein the first inductor and the first flying capacitor are coupled to the first leg of switching transistors of the second bridge portion of the switching bridge, and the second flying capacitor is coupled to the second leg of the switching transistors of the second bridge portion.

In Aspect 4, the subject matter of Aspect 3 optionally includes one or more current source circuits configured to pre-charge the first flying capacitor, the second flying capacitor, and the midpoint capacitor prior to the activation of switching transistors of the switching transistor bridge to generate the regulated voltage.

In Aspect 5, the subject matter of one or any combination of Aspects 2-4 optionally includes the first leg of the switching transistors of the second bridge portion includes a first transistor and a second transistor, and the second leg of switching transistors of the second bridge portion includes a third transistor and a fourth transistor; the first bridge portion of the switching bridge includes a fifth, sixth and seventh transistor; and the control circuit is configured to switch the second, fourth, and sixth transistors complimentary to the first, third, fifth, and seventh transistors according to a switching cycle to drive the first PWM filter stage circuit.

In Aspect 6, the subject matter of Aspect 5 optionally includes the charge pump circuit dividing the input voltage by three and switching of transistors coupled to the first PWM filter stage circuit reduces the output of the charge pump circuit according to a duty cycle of the switching cycle.

In Aspect 7, the subject matter of one or any combination of Aspects 1-6 optionally includes a second PWM filter stage circuit coupled to a switching circuit node of the second bridge portion of the switching bridge and a third input/output terminal.

In Aspect 8, the subject matter of Aspect 7 optionally includes a downstream direct current to direct current (DC-DC) converter coupled to each of the second input/output terminal and the third input/output terminal.

In Aspect 9, the subject matter of one or any combination of Aspects 1-8 optionally includes a second inductor coupled to the second flying capacitor and the second input/output terminal.

In Aspect 10, the subject matter of one or any combination of Aspects 1-9 optionally includes a driver bias circuit configured to provide a driver bias voltage to transistors of the first bridge portion of the switching transistor bridge, wherein the driver bias circuit includes one or more diodes driving a boost capacitor coupled to one or more transistors of the first bridge portion of the switching transistor bridge.

In Aspect 11, the subject matter of one or any combination of Aspects 1-10 optionally includes a control circuit configured to control activation of switching transistors of the switching bridge to generate a boosted regulated voltage.

Aspect 12 can include subject matter (such as a voltage converter circuit) or can optionally be combined with one or any combination of Aspects 1-11 to include such subject matter, comprising a charge pump circuit, a PWM filter stage circuit, and a control circuit. The charge pump circuit includes a midpoint capacitor; first and second flying capacitors; a first set of multiple switching transistors connected in series between a circuit input node, the first and second flying capacitors, and the midpoint capacitor; a second set of multiple switching transistors connected between the midpoint capacitor, the first and second flying capacitors, and a circuit ground node. The PWM filter stage circuit is coupled to the charge pump circuit and a circuit output node, and includes an inductor coupled to the second flying capacitor. The control circuit is configured to control activation of the first and second sets of multiple switching transistors to generate a regulated voltage at the circuit output node, including converting a voltage between the input circuit node and the midpoint capacitor by a conversion ratio equal to or greater than three-to-one.

In Aspect 13, the subject matter of Aspect 12 optionally includes a control circuit configured to switch the first set of multiple switching transistors on and off together complimentary to the second set of multiple switching transistors according to a switching cycle to drive the PWM filter stage circuit.

In Aspect 14, the subject matter of Aspect 13 optionally includes the second set of multiple switching transistors including a first switching transistor and a second switching transistor connected in parallel between the midpoint capacitor and the first and second flying capacitors; and a third and fourth switching transistor connected in parallel between the first and second flying capacitors and the circuit ground node.

Aspect 15 can include subject matter (such as a voltage converter circuit) or can optionally be combined with one or any combination of Aspects 1-14 to include such subject matter, comprising a charge pump circuit, a switching converter circuit, and a control circuit. The charge pump circuit includes a midpoint capacitor; a first set of switching transistors connected in series between an input circuit node and a second circuit node; first, second, and third flying capacitors coupled to the first set of switching transistors; and a second, a third, and a fourth set of switching transistors, each coupled to a respective one of the first, second, or third flying capacitors.

In Aspect 16, the subject matter of Aspect 15 optionally includes each of the second, third, and fourth sets of switching transistors includes a first switching transistor and a second switching transistor connected in series between the midpoint capacitor and the circuit ground node, and each of the respective first, second, and third flying capacitors is connected to a series connection of one of the second, third, and fourth set of switching transistors.

In Aspect 17, the subject matter of one or both of Aspects 15 and 16 optionally includes the second circuit node connected to the midpoint capacitor and the charge pump circuit is a divide-by-four charge pump circuit.

In Aspect 18, the subject matter of one or both of Aspects 15 and 16 optionally includes the second circuit node being the circuit ground node and the charge pump circuit is a divide-by-three charge pump circuit.

In Aspect 19, the subject matter of one or any combination of Aspects 15-18 optionally includes a control circuit configured to switch transistors of the first, second, third, and fourth sets of switching transistors according to four transistor groups; the four transistor groups including a first transistor group and a second transistor group coupled to the first flying capacitor and the third flying capacitor, and a third transit group and a fourth transistor group coupled to the second and third flying capacitors; switch the first transistor group complimentary to the second transistor group according to a first switching cycle; and switch the third transistor group complimentary to the fourth transistor group according to a second switching cycle.

In Aspect 20, the subject matter of Aspect 19 optionally includes a control circuit configured to interleave the switching of the first and second transistor groups with the switching of the third and fourth transistor groups.

These non-limiting Aspects can be combined in any permutation or combination. It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus, the accompanying method claims present elements of the various steps in a sample order and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a circuit or processor configured to monitor and control an operation or a component may also mean the circuit or processor being programmed to monitor and control the operation or being operable to monitor and control the operation. Likewise, a circuit or processor configured to execute code may be construed as a circuit or processor programmed to execute code or operable to execute code.

The terms "start-up" and "power-up" are intended to include, but not be limited to, the plain meaning of each respective term, and for the purposes of this disclosure may be used interchangeably. The terms "start-up" and "power-up" may include, for example, a point in time at which a circuit is turned on (e.g., started) and/or a period of time shortly thereafter.

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

What is claimed is:

1. A voltage converter circuit comprising:
   a charge pump circuit including:
      multiple switching transistors arranged as a switching bridge including a first bridge portion connected to a first input/output terminal and a second bridge portion;
      a midpoint capacitor connected to a circuit node coupling the first bridge portion and the second bridge portion; and
      a first flying capacitor coupled to the first bridge portion and the second bridge portion;
   a first pulse width modulation (PWM) filter stage circuit coupled to the charge pump circuit and a second input/output terminal; and including a first inductor coupled to the first flying capacitor and the second bridge portion of the switching bridge; and
   a control circuit configured to control activation of switching transistors of the switching bridge to generate a regulated voltage at one of the first input/output terminal or the second input/output terminal, including converting a voltage between the first input/output terminal and the midpoint capacitor by a conversion ratio equal to or greater than three-to-one.

2. The voltage converter circuit of claim 1,
   wherein the first bridge portion includes multiple switching transistors connected in series;
   wherein the second bridge portion includes a first leg of multiple switching transistors connected in series and a second leg of multiple switching transistors connected in series, and the first leg of switching transistors is connected in parallel with the second leg of switching transistors.

3. The voltage converter circuit of claim 2, including a second flying capacitor, wherein the first inductor and the first flying capacitor are coupled to the first leg of switching transistors of the second bridge portion of the switching bridge, and the second flying capacitor is coupled to the second leg of the switching transistors of the second bridge portion.

4. The voltage converter circuit of claim 3, including one or more current source circuits configured to pre-charge the first flying capacitor, the second flying capacitor, and the midpoint capacitor prior to the activation of switching transistors of the switching transistor bridge to generate the regulated voltage.

5. The voltage converter circuit of claim 2,
   wherein the first leg of switching transistors of the second bridge portion includes a first transistor and a second transistor, and the second leg of switching transistors of the second bridge portion includes a third transistor and a fourth transistor;
   wherein the first bridge portion of the switching bridge includes a fifth, sixth and seventh transistor; and
   wherein the control circuit is configured to switch the second, fourth, and sixth transistors complimentary to the first, third, fifth, and seventh transistors according to a switching cycle to drive the first PWM filter stage circuit.

6. The voltage converter circuit of claim 5, wherein the charge pump circuit divides an input voltage by three and switching of transistors coupled to the first PWM filter stage circuit reduces the output of the charge pump circuit according to a duty cycle of the switching cycle.

7. The voltage converter circuit of claim 1, including a second PWM filter stage circuit coupled to a switching circuit node of the second bridge portion of the switching bridge and a third input/output terminal.

8. The voltage converter circuit of claim 7, including a downstream direct current to direct current (DC-DC) converter coupled to each of the second input/output terminal and the third input/output terminal.

9. The voltage converter of claim 1, including a second inductor coupled to the second flying capacitor and the second input/output terminal.

10. The voltage converter of claim 1, including a driver bias circuit configured to provide a driver bias voltage to transistors of the first bridge portion of the switching transistor bridge, wherein the driver bias circuit includes one or more diodes driving a boost capacitor coupled to one or more transistors of the first bridge portion of the switching transistor bridge.

11. The voltage converter circuit of claim 1, wherein the control circuit configured to control activation of switching transistors of the switching bridge to generate a boosted regulated voltage.

* * * * *